(12) United States Patent
Shapira et al.

(10) Patent No.: US 7,946,504 B2
(45) Date of Patent: May 24, 2011

(54) ELECTRONIC FAUCET AND MANUAL OVERRIDE SYSTEM THEREFOR

(76) Inventors: Yuval P. Shapira, Haifa (IL); Asaf Shaltiel, Haifa (IL)

( * ) Notice: Subject to any disclaimer, the term of this patent is extended or adjusted under 35 U.S.C. 154(b) by 598 days.

(21) Appl. No.: 12/003,936

(22) Filed: Jan. 3, 2008

(65) Prior Publication Data

US 2008/0156889 A1 Jul. 3, 2008

Related U.S. Application Data

(60) Provisional application No. 60/877,843, filed on Jan. 3, 2007.

(51) Int. Cl.
*G05D 23/13* (2006.01)
*B01F 5/04* (2006.01)
*F16K 31/02* (2006.01)
(52) U.S. Cl. ............... 236/12.12; 137/897; 251/129.04
(58) Field of Classification Search ............... 236/12.1, 236/12.11, 12.12; 251/129.04; 137/895, 137/896, 897, 606, 607
See application file for complete search history.

(56) References Cited

U.S. PATENT DOCUMENTS

| | | | | |
|---|---|---|---|---|
| 4,222,410 A | * | 9/1980 | Geimer | 137/606 |
| 4,696,428 A | | 9/1987 | Shakalis | |
| 4,700,885 A | * | 10/1987 | Knebel | 236/12.16 |
| 4,842,191 A | * | 6/1989 | Bergmann | 236/12.12 |
| 6,438,770 B1 | * | 8/2002 | Hed et al. | 4/668 |
| 6,913,203 B2 | | 7/2005 | DeLangis | |
| 7,624,757 B2 | * | 12/2009 | Schmitt | 137/606 |

* cited by examiner

*Primary Examiner* — Chen-Wen Jiang

(57) ABSTRACT

An electronic faucet for mixing hot and cold fluids and a manual override system therefor. The override system is adapted to override the electronics of the faucet in order to allow a user to gain full manual control, for example, if the user merely desires it or there is a malfunction in the faucet's electronics or an electric power outage. The faucet can be operated in an automatic mode, a manual mode and switch between those modes. According to one embodiment, the override system disables the faucet's electronics as a result of manual movement of the handles causing a motor of the electronic faucet to deviate from its normal resistance or current, signaling the electronics to become disabled. According to another embodiment, pulling or pushing of the handles mechanically disengage them from the electronic control.

13 Claims, 6 Drawing Sheets

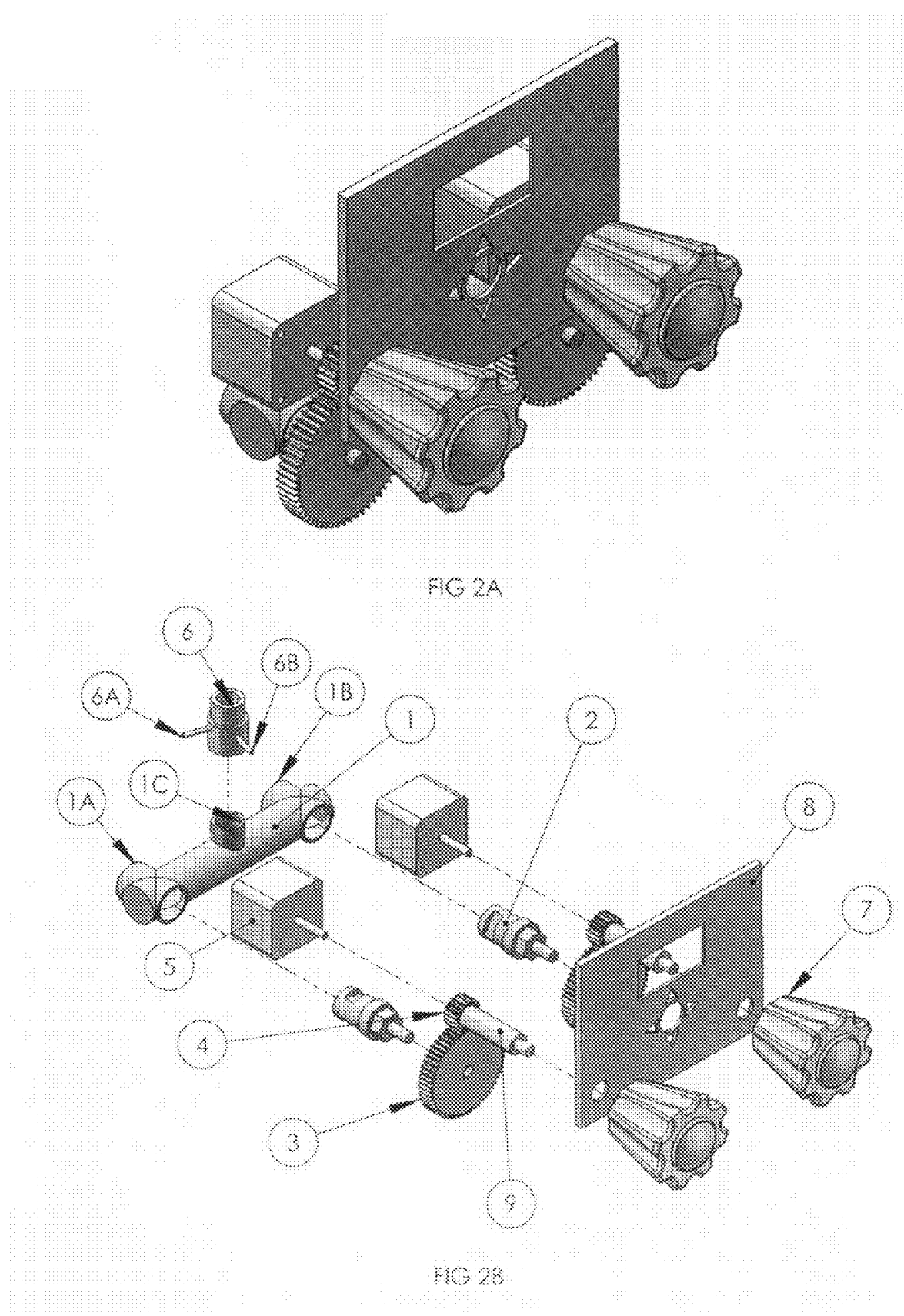

ELECTRONIC FAUCET AND MANUAL OVERRIDE SYSTEM THEREFOR

CROSS-REFERENCE TO RELATED APPLICATIONS

This application is based on provisional patent application No. U.S. 60/877,843, filed on 3 Jan. 2007.

FIELD OF INVENTION

The present invention relates to faucets, in particular electronically controlled faucets.

BACKGROUND OF THE INVENTION

Electronic faucets of various types and designs are available on the market, however they have not yet succeeded in penetrating the main market. One likely reason for this is that the right combination of proposed advantages over traditional faucets and an affordable price has not yet been found. Also, it is important to note that electronic faucets are potentially hazardous devices, since they can deliver very hot fluid (typically water) that could cause serious burns to a person using it (e.g. while taking a shower). In order to succeed in marketing such products, the customer should be reassured that electronic faucets are safe. Further, the customer wants to be assured that in case of a failure of the system, he or she can still take a shower.

Electronic faucets or mixing devices typically comprise a keypad and a display screen (usually an LCD), generally referred to as electronic I/O (input/output), and a microcomputer that receives data from a temperature sensor (e.g. a thermocouple in the flow stream) and a flow sensor device. The data is compared to the desired temperature and/or flow that has been set (i.e. set point) by the user and a signal is sent to an electronically controlled valve or valves to control the mix of hot and cold water and/or overall flow rate. The electronic I/O can potentially also allow voice activation, proximity activation, etc.

Thus, an electronic faucet can control the dispensing of water at a relatively constant desired temperature and/or flow rate despite potential temperature and pressure deviations that may occur in the water supply while one showers, or for other use. Further, the electronic faucet eliminates the typical trial and error process when attempting to set a desired water temperature and flow rate.

U.S. Pat. No. 4,696,428 (to Shaklis) describes an electronic fluid temperature and flow control system that comprises a mixing valve for controlling the water temperature and a volume control valve for controlling the water flow rate. In light of the issue of providing water even in the event of a failure of the electronic faucet, the system comprises a separate/alternate water pathway with manual valves to allow manual control of the system when needed. When the system is disabled, the manual controls can be used to provide water. The manual controls do not have direct influence on the malfunctioned electronic system which, if not disabled, can still potentially supply undesirably hot or cold water, at least until it is disabled.

U.S. Pat. No. 6,913,203 (to DeLangis) describes a self-powered electronically controlled mixing valve adapted for convenient retrofitting. The mixing valve is powered by a turbine generator, the energy being stored in a battery or capacitor. Water flow rate is controlled by existing hot and cold water valves and the temperature is controlled via a microcomputer of a main control unit by a touch pad. If no response is received from the main control unit, due to a failure such as a turbine or battery failure, the microcomputer will default to a warm water temperature of 85 degrees F. (approx. 30 degrees C.) and produce three long beeps. Should the microcomputer malfunction and allow scalding water to flow, there is failsafe hardware circuitry to disengage a stepper motor from the mixing valve causing the valve to relocate to a 50% hot water and 50% cold water mix. The system additionally comprises a mechanical protection device which limits the maximum possible temperature to 175 degrees F. (approx. 80 degrees C.) should the microcomputer and fail safe circuitry both fail.

SUMMARY OF THE INVENTION

The present invention relates to an electronic faucet for controlling the temperature of fluid dispensed therefrom and a manual override system therefor. According to certain embodiments, the electronic faucet also controls the flow rate of the fluid dispensed; and the manual override system is adapted to manually control that flow rate as well.

In accordance with one aspect of the present invention, there is provided an electronic faucet for mixing a hot fluid and a cold fluid to a settable temperature and flow rate, the faucet comprising:
  a) a mixing body within the hot fluid and the cold fluid are mixed, the body comprising an inlet for the hot fluid and an inlet for the cold fluid, and an outlet from which the mixed fluids are discharged therefrom;
  b) at least one mixing valve at the mixing body to control the ratio of the hot and cold fluids;
  c) a temperature sensor for sensing the temperature of the mixed fluids and outputting a signal corresponding to the temperature;
  d) an electronic control system which receives the signal of the fluid temperature sensor for controlling the at least one mixing valve to adjust the ratio of the hot and cold fluids;
  e) an interface for programming the electronic control system to allow setting of at least one of the temperature and the flow rate of the mixed fluids; and
  f) at least one motor for adjusting at least one of the ratio of the hot and cold fluids received by the mixing body and the flow rate of the mixed fluids discharged from the mixing body;
wherein the faucet further comprises a manual override system comprising a handle or pair of handles operably connected to the electronic control system and adapted to override the electronic control system whereby the faucet is manually controllable by the handle or pair of handles.

In accordance with another aspect of the present invention, there is provided a manual override system for an electronically controlled faucet adapted to mix a hot fluid and a cold fluid to a settable temperature and flow rate, the faucet comprising:
  a) at least one mixing valve at the mixing body to control the ratio of the hot and cold fluids;
  b) a temperature sensor for sensing the temperature of the mixed fluids and outputting a signal corresponding to the temperature;
  c) an electronic control system which receives the signal of the fluid temperature sensor for controlling the at least one mixing valve to adjust the ratio of the hot and cold fluids;
  d) an interface for programming the electronic control system to allow setting of at least one of the temperature and the flow rate of the mixed fluids; and
  g) at least one motor for adjusting at least one of the ratio of the hot and cold fluids received by the mixing body and the flow rate of the mixed fluids discharged from the mixing body;
and the manual override system comprising a handle or pair of handles operably connected to the electronic control system and adapted to override the electronic control system whereby the faucet is manually controllable by the handle or pair of handles.

The term "faucet" will be used herein in its broadest sense and may include a wide variety of fluid mixing devices, and for applications other than mixing hot and cold water (e.g. other liquids or gases), for both home and industrial use.

A major advantage of the present invention is that it allows full, manual control over the faucet in a traditional way, by the faucet handles, which will be referred to as manual overriding.

The manual override feature is convenient in many situations. For example, many people are "techno-phobic" and would prefer to control the water temperature and flow rate of their shower in a traditional way. Should the electronic faucet be installed in a guest house or a rental apartment, this feature would leave certain guests/renters more at ease. Moreover, the manual override feature is important for safety reasons. Should any malfunctioning occur in the electronics resulting in a flow of uncomfortably hot or cold water, the user has means to quickly and conveniently switch to manual control. And, this means is via the instinctive and traditional method of adjusting the faucet handles.

The manual override feature is also convenient when the power source or microcomputer of the electronic faucet malfunctions as one can shower even in the case of such a malfunction.

In addition, the present invention utilizes simple mechanisms that are easily manufactured and for the most part use standard components; and it can typically be retrofitted into existing faucets.

Regardless the potential use in various settings and usages, for simplicity, the invention will be described in relation to use for mixing (temperature control) and/or controlling the flow of hot and cold water. In particular the invention will be described in terms of a household faucet, for example, a shower faucet.

BRIEF DESCRIPTION OF THE DRAWINGS

The invention may be more clearly understood upon reading of the following detailed description of non-limiting exemplary embodiments thereof, with reference to the following drawings, in which:

FIGS. 2A and 2B show perspective assembled and exploded views of a modification of the embodiment of FIGS. 1A and 1B;

DESCRIPTION OF EMBODIMENTS OF THE INVENTION

Figure 1A:
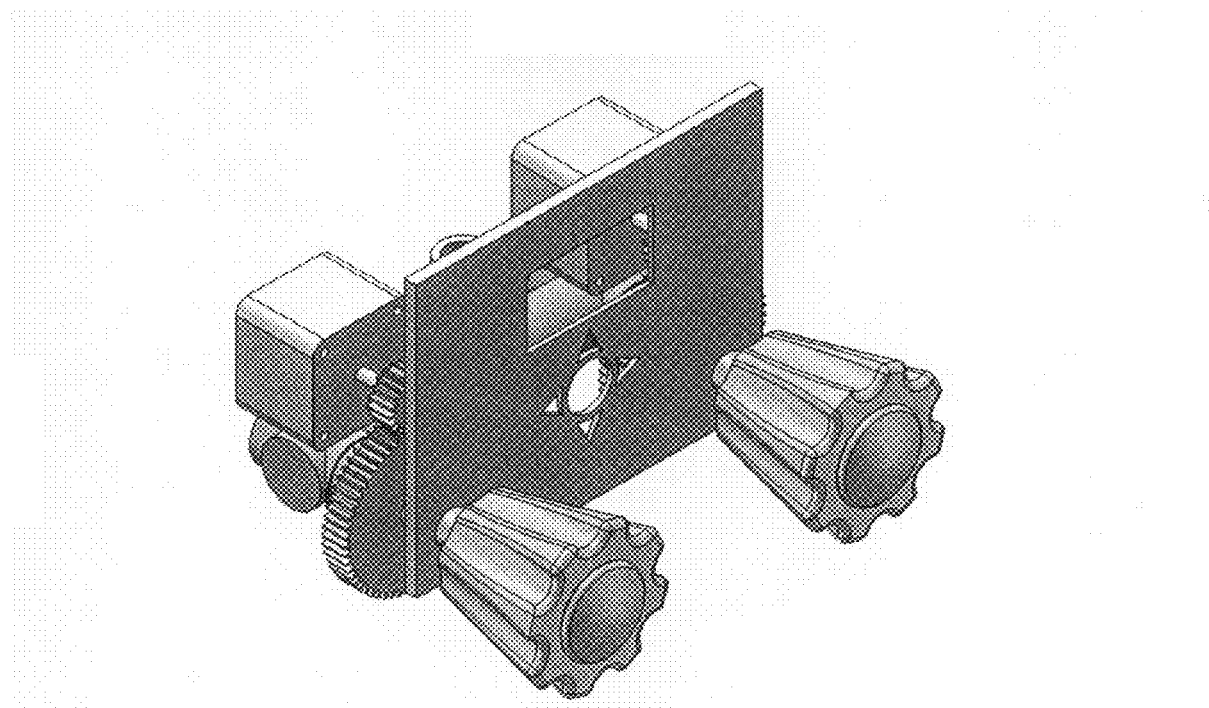
FIGS. 1A and 1B show perspective assembled and exploded views of an embodiment of an electronic faucet and manual override mechanism of the present invention.
Figure 1B:
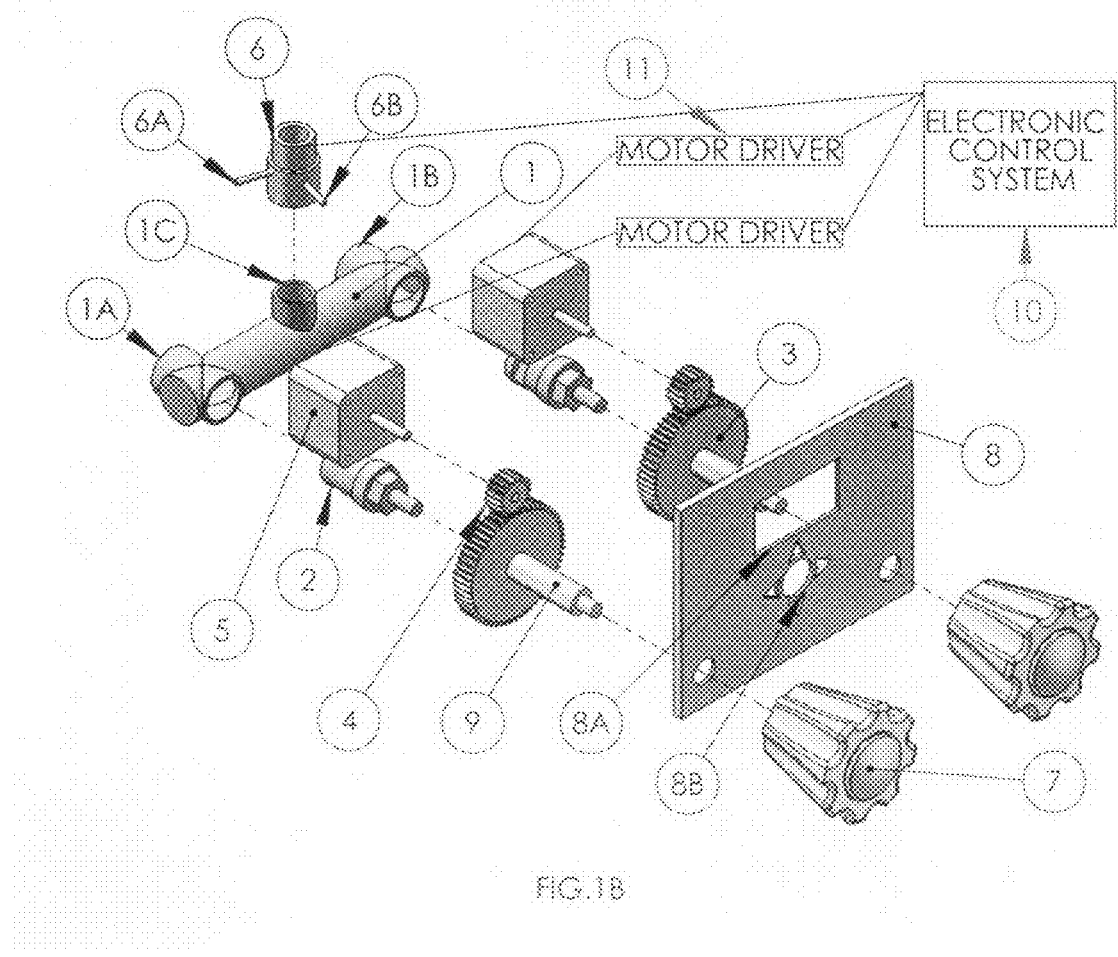

Referring initially to FIG. 1B, there is shown a first embodiment of an electronic faucet and override mechanism therefor comprising a mixing body 1 with hot and cold water inlets 1A and 1B and an outlet 1C for the mixed water. In this embodiment, the override mechanism is used to disable the automatic aspect of the electronic faucet, which may be required, for example in the case of an electronic failure, or which may simply be choice of the user who wishes to switch from an automatic mode to a manual mode.

Two mechanical valves 2 are installed in each of the inlets 1A and 1B of the mixing body 1. A standard two-valve mixing body can be a cost-efficient choice, though smaller, specially designed bodies can also be used chosen (e.g. as seen in FIG. 6B). Each mechanical valve 2 is connected through a transmission, comprising a pair of valve gears 3 and motor gears 4, to a motor 5. As such, each motor 5 can rotate its valve 2 independently to control the flow of hot and cold water into the inlets 1A and 1B.

The type of valves used is not meant to be restricted to valves similar to those shown in the figures. Nevertheless, a standard ½-inch quarter-turn ceramic valve is a good choice as it can be rotated with low torque. Such low torque simplifies the requirements for the motor power and allows the use of motors with low operation power, reducing the energy needs. The energy consumption issue is especially important when the electronic system is powered or backed-up by DC batteries. The use of standard valves is also very cost efficient.

At the outlet 1C is a pipe connection or stub 6 with a temperature sensor 6A and flow sensor 6B. The illustrated locations of the sensors 6A and 6B are merely illustrative, and it should be understood that the sensors should be disposed in an appropriate location so as to provide proper measurements.

It is a particular feature of the invention that the override mechanism or system of the present invention is a manual one and moreover can be actuated by a standard handle 7 or pair thereof, accessible by the user. The faucet and override system therefor can be devised with a single handle (e.g. as in the embodiment of FIGS. 6A and 6B) or a pair of handles, and is not limited in design to a spin-type handle, as shown, rather the handle(s) could be of the lever type, pull-out type and so on, mutatis mutandis.

The handles are typically separated from the remainder of the faucet components, for example, by a plate or panel 8, which may have cut outs 8A and 8B for holding a temperature display and programming keypad (not shown). The handles 7 are connected to the valve gears 3 via handle stems 9 via a pair of corresponding through-holes in the panel 8.

The faucet (i.e. mix of hot and cold water) is automatically controlled by a schematically illustrated electronic control system 10 which can be any appropriate such controller typically comprising electronic I/O, a microprocessor, auxiliary electronic elements and power supply (not detailed in the figures). Operably connected to the electronic control system 10 and motors 5 are a pair of motor drivers 11 (also schematically depicted), one for each motor.

In the present embodiment, the motor drivers 11 are adapted to detect a motor parameter, for example, an out of tolerance motor resistance or current. Upon detecting such an out of tolerance situation, which can be preset, the motor driver 11 sends a signal to the electronic control system 10. Upon receiving such a signal, the electronic control system 10 deactivates or disables the driver. An example of a motor and motor driver combination with such capabilities is a stepper motor driven by an L298 or L293E driver.

FIG. 1A shows the faucet and override mechanism assembled, illustrating the compactness of the mechanical components; however, without the electronic control system 10 and motor drivers 11.

With such a design, the faucet can be operated electronically or manually. To operate it electronically, the faucet is programmed by the user, e.g. via a keypad or the like, to provide water at a particular temperature. The flow rate can also be programmed and controlled in a closed loop provided the flow sensor 6B is installed. Alternatively, the flow can be set by the handles 7.

Once the desired conditions are chosen, the electronic control system 10 controls the temperature by adjusting the ratio of hot and cold water into the mixing body 1. The water conditions are measured by the sensors 6A and 6B and compared to the desired (set point) conditions and the position of the valves 2 are moved by activating the motors 5 in order to minimize the difference between the set point(s) and the measured water conditions. The type of the closed-loop control algorithm implemented can be PID (proportional, integral and derivative), LQ (linear quadratic) or any other suitable type of control algorithm. The user can stop the water flow or change the desired conditions any time by the electronic I/O. During the automatic mode of operation the handles 7 will rotate as they are connected to the motors 5 through the transmission (gears 3 and 4).

The faucet can alternatively be operated manually. As the handles 7 and the valves 2 are connected by the handle stems 9, the user can rotate the handles freely when the electronic control system 10 is off. The motors 5 will also be rotated via the transmission (gears 3 and 4), but if the motor does not contain a high reduction unit, the torque needed to rotate both the valves and the motors is close to that of a traditional faucet.

The user can switch from the manual mode to the automatic mode by means of the electronic I/O. In accordance with a particular feature of the invention, the user can also switch from the automatic mode to the manual mode any time without any need to interface with the I/O. When the electronic control system is active the user simply turns one or both of the handles 7 against the force of the corresponding motor(s) 5. In the case, for example, of a low-reduction transmission of the motors, the electrical resistance of the motor(s) 5 is lowered and the current flow through the motor(s) rises. This rise in current or equivalent lowering in electrical resistance can be sensed by suitable electronic circuitry (e.g. of the motor driver 11). As noted above, in case of stepper motors, they can be driven by L298 or L293E drivers, which have the built in sensing capability as just described.

According to other embodiments, the override system comprises a proximity sensor to sense the proximity of the user's hand(s) to the handles 7, whereby a signal is sent to shut off the automatic control is sent.

When the rise in the current due to user interference is detected by the motor driver 11, the electronic control system 10 becomes passive, and power to the motors 5 is cut. Thus, the operation mode is switched to the manual mode simply by turning one or both of the handles 7, without any need to interact directly with the electronic I/O. Regardless, the invention does not preclude the possibility of switching from the automatic mode to the manual mode via the electronic I/O.

FIGS. 2A and 2B illustrate another embodiment of the present invention wherein the same reference numbers are used to denote comparable components as described above. The difference between this embodiment and the previous one is that handles 7 are connected to the motor gears 4, via the handle stems 9, rather than being connected to the valve gears 3.

The operation of the faucet and manual override are not affected by the aforementioned change in transmission connections. However, when the handles 7 are connected to the relatively small gears 4 there is less effort required to apply a counter force to the motors 5 and to affect movement of the valves 2. On the other hand, a greater amount of turning is required to affect a given movement of the valves 2.

It should be understood that, the transmission constituted by gears 3 and 4 in the embodiments described above, could comprise one or more additional transmission gears between the valves 2 and the motors 5 in order to reduce the requirements on the motor's torque, whereby even high reduction gear-boxes can be utilized.

Figure 3:
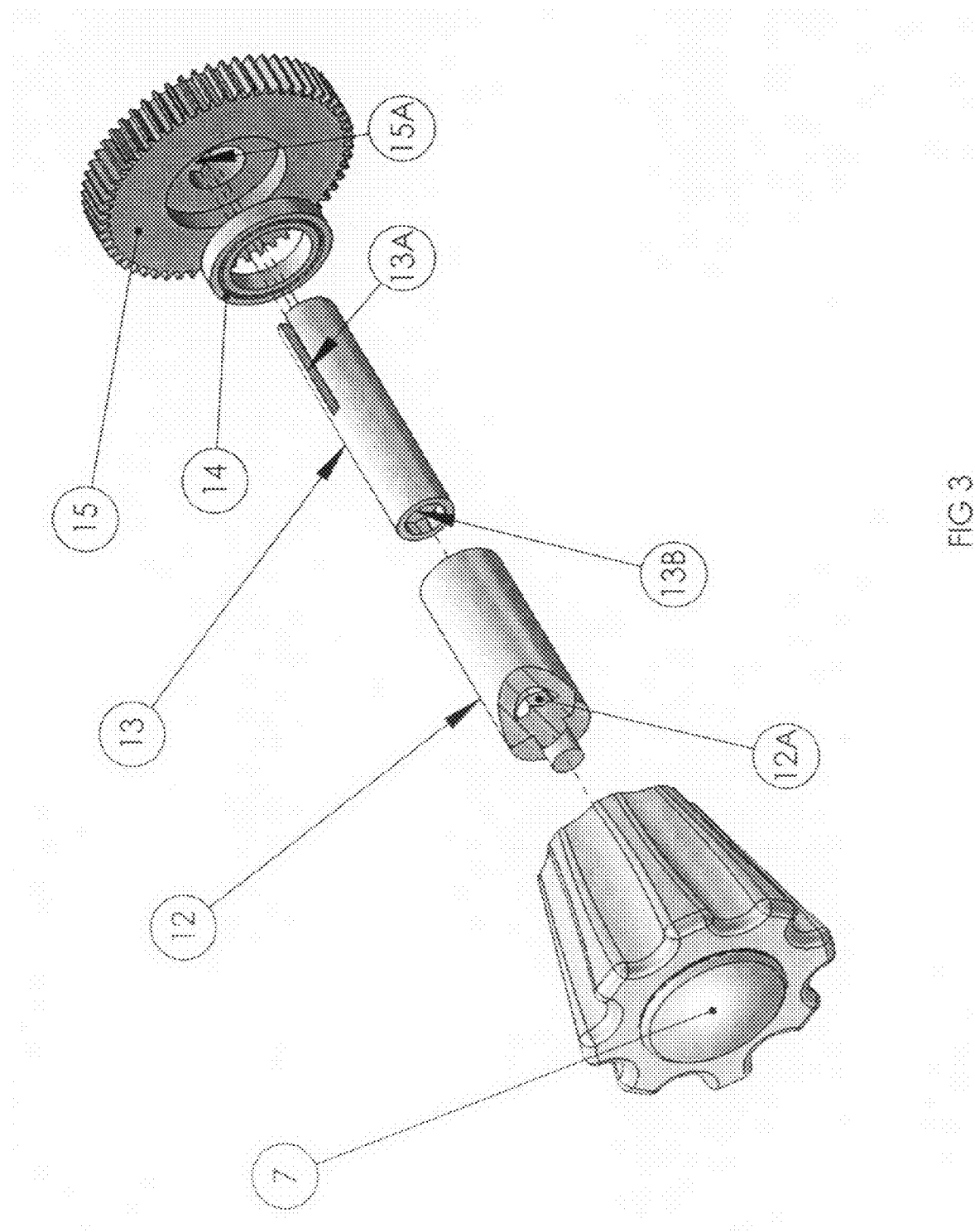
FIG. 3 is a perspective exploded view illustrating another embodiment of the manual override mechanism.

FIG. 3 shows another embodiment of the faucet and override system comprising a different override mechanism that causes the manual controls to disengage from the automatic control. This embodiment, and equivalents thereto, can be advantageous when the motors 5 contain a high reduction gear box (e.g. a reduction ration of 100). In such a case, it may be difficult to rotate the valves 2 by the handles 7, as the high reduction motors 5 are connected to the valves 2 via the gear transmission and therefore must also be rotated. On the other hand, such high reduction motors 5 have low power consumption and this is desirable when the faucet is powered by batteries.

As seen in FIG. 3, (and with reference to FIGS. 4A, 4B, 5A and 5B), instead of the handle stems 9, the override mechanism of this embodiment comprises hollow cylindrical extensions 12, pistons 13 and bearings 14 (only one of each seen, as only one handle 7 is shown). The hollow cylindrical extension 12 is open at one end and is closed at the other end, where it connects to the handle 7, and is shown in partial cut away to show that in its interior it comprises a projection or male connector 12A. The cylindrical piston 13 is dimensioned to slide into the open end of the extension 12 and comprises a recess or female connector 13B corresponding to the male connector 12A. The exterior of the male connector 12A can be, for example, square (or pentagonal, hexagonal and so on), and the interior of the female connector 13B is correspondingly shaped so that when they are engaged and the piston 13 spins, the extension 12 will like-wise spin. Preferably, the corresponding shape of the female connector 13B comprises more points than the male connector 12A, so that they will readily engage. It should be understood that this connection is merely exemplary and many other interface configurations are possible.

The piston 5 also comprises a longitudinally extending slit 13A whose profile corresponds in shape to a tooth 15A in a gear wheel 15, which takes the place of the valve gear 3 in the previous embodiments. However, the gear wheel 15 can be any gear wheel in a transmission link between the valve 2 and the motor 5, as mentioned above, and is shown as a valve gear for simplicity of design and description. The gear wheel 15 comprises a bearing 14 so that when in the automatic mode and the gear wheel 15 is turned by the motor 5, the handle 7 will not spin.

Figure 4A:
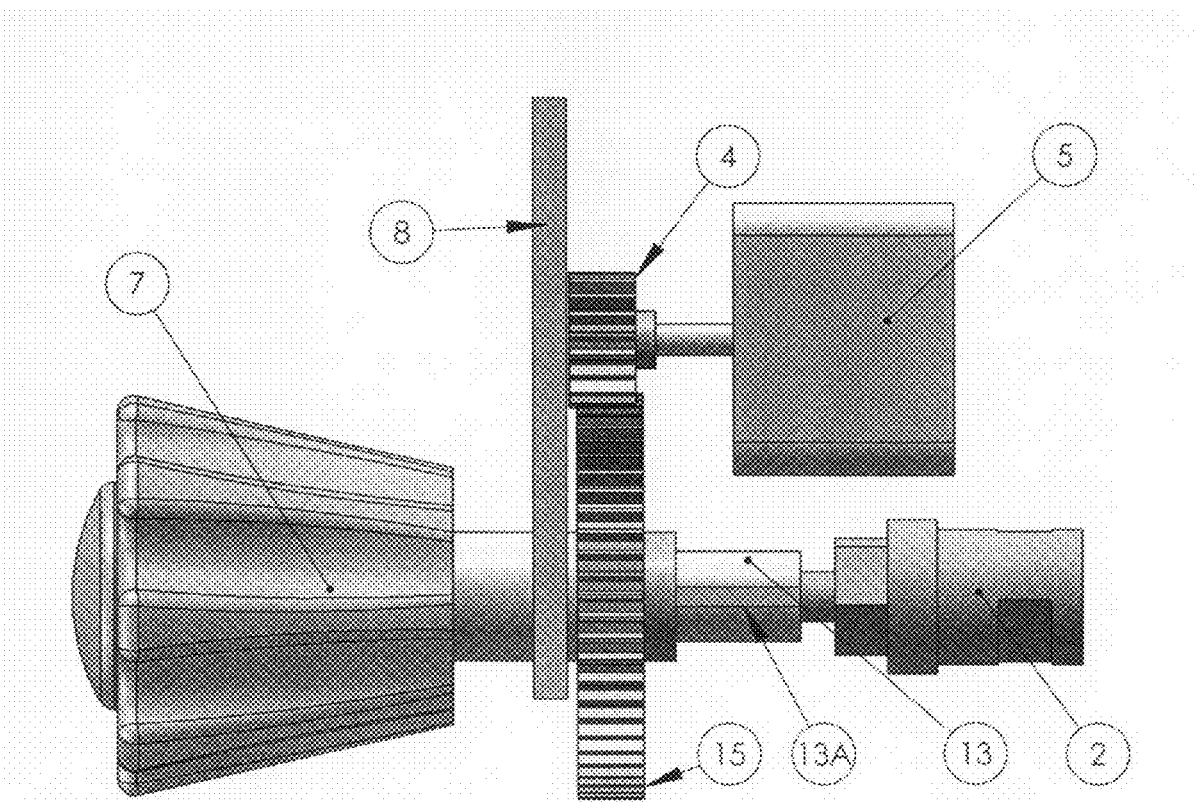
FIG. 4A is a side view of the embodiment of FIG. 3 in an engaged position with a valve control motor of the electronic faucet.
Figure 4B:
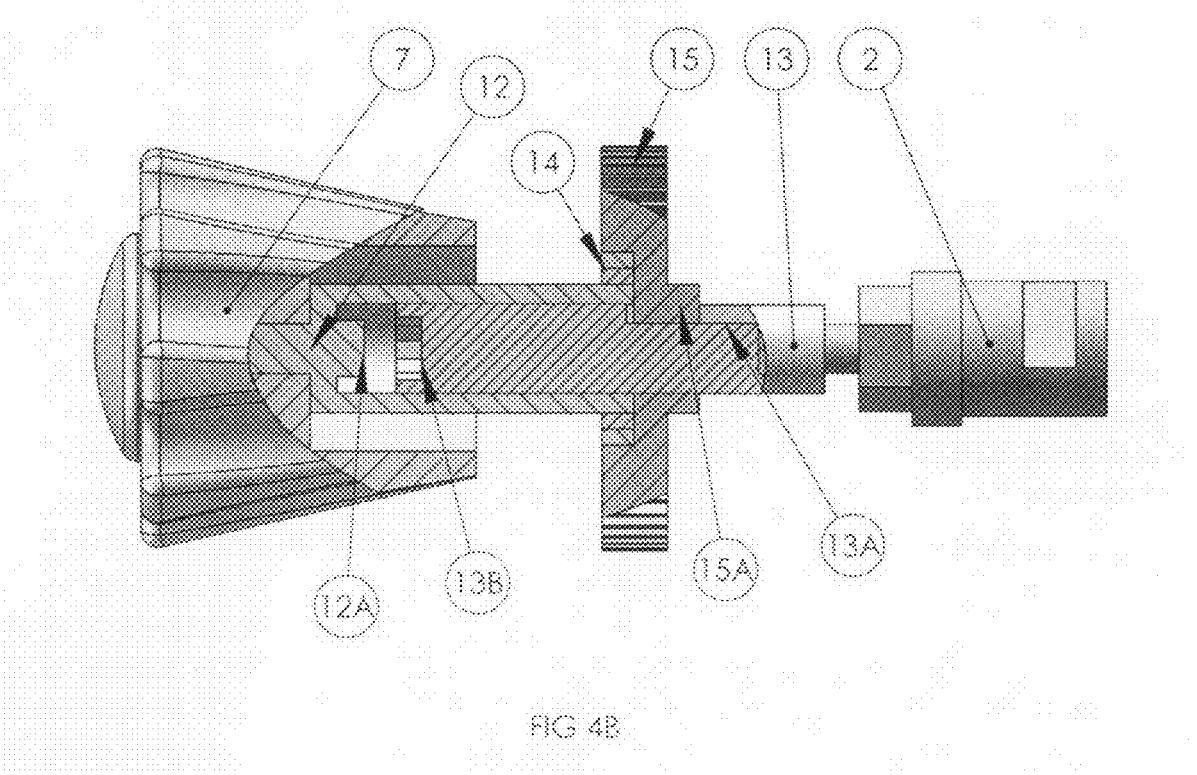
FIG. 4B is a view as in FIG. 4A with a partial cut out exposing a sectional view of components of the override mechanism.
Figure 5A:
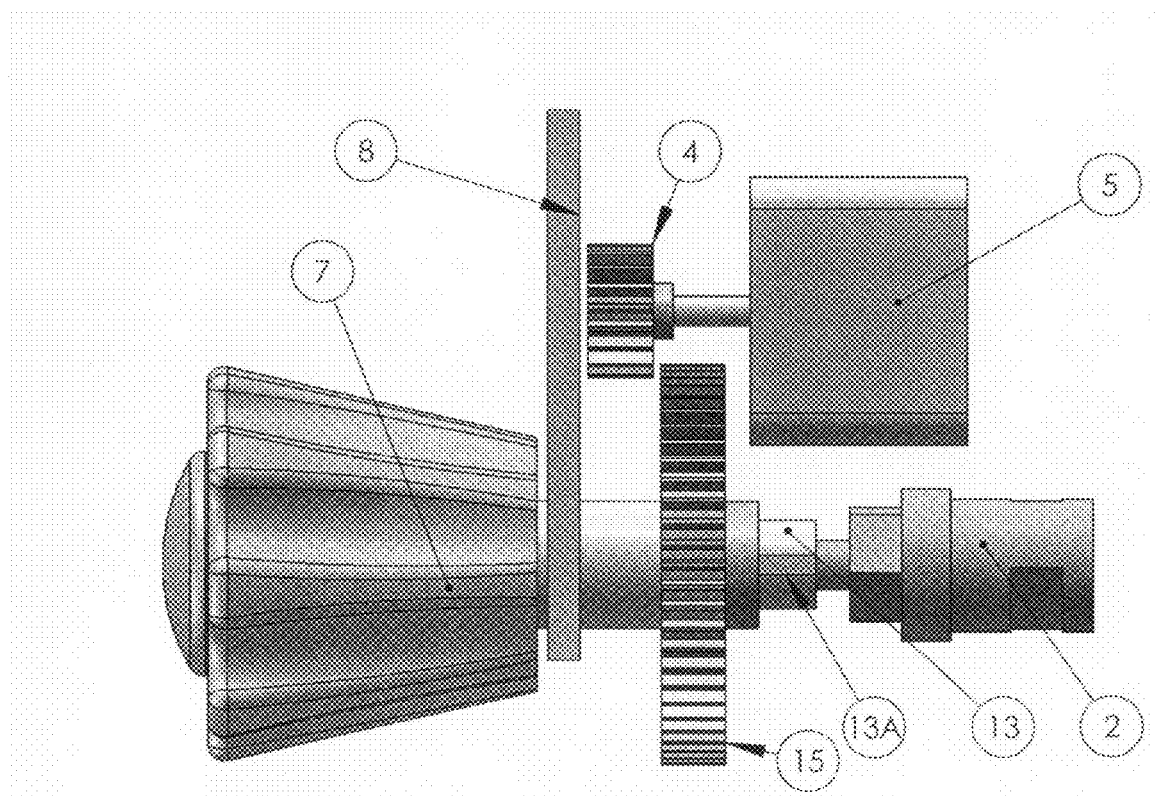
FIG. 5A is a side view of the embodiment of FIG. 3 in a disengaged position from a valve control motor of the electronic faucet.
Figure 5B:
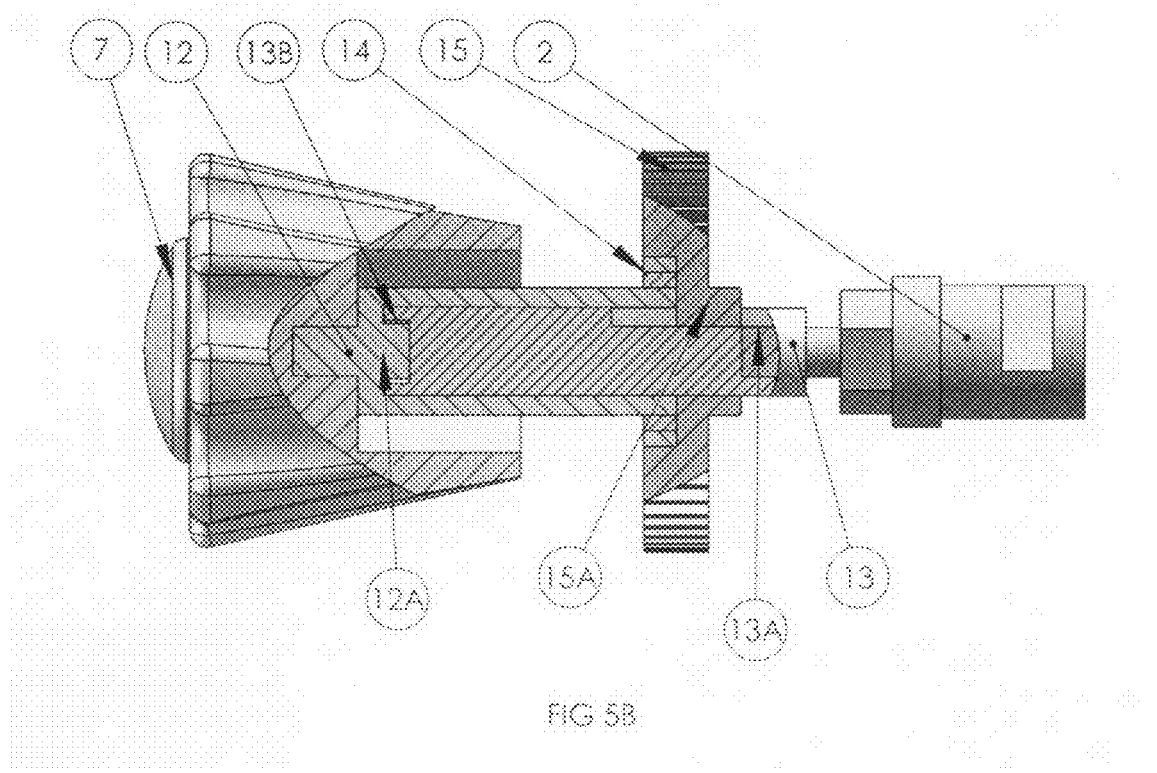
FIG. 5B is a view as in FIG. 5A with a partial cut out exposing a sectional view of components of the override mechanism.

FIGS. 4A, 4B, 5A & 5B illustrate the operation of the disengaging-type manual overriding mechanism just described with reference to FIG. 3. FIGS. 4A and 4B show the assembly and the section views of the relevant components when in the automatic mode; and FIGS. 5A and 5B show the assembly and the section views of the relevant components in the manual mode.

As should be understood from these figures, the handles 7 can be pushed inward and pulled outward, however, within a restricted distance. When the handles 7 are in an outward position (FIGS. 4A and 4B), the gear wheels 15 intermesh with the motor gears 4 so that the motors 5 affect adjustment of valves 2 (automatic mode). Because of the bearings 14 the rotation of the gear wheels 15 is not translated to the handles 7, rather the rotation is translated via the piston 13 to the valve 2 due to the slit 13A interfacing with the tooth 15A of the wheel gear 15. In this outward handle position, the motors 5 rotate the valves 2 and the control over the water mix is automatic.

When the handles 7 are in an inward position (FIGS. 5A and 5B), the gear wheels 15 are disengaged from the motor gears 4 so that the motors 5 can not affect adjustment of valves 2. The inward push on the handles 7 pushes on the extension 12 bringing the male connector 12A to interface with the female connector 13B of the piston 13. Thus, rotation of the handles 7, is translated via the piston 13 to the valve 2, due to the slit 13A interfacing with the tooth 15A of the wheel gear 15, and thus to the valves 2. In this inward handle position, the motors 5 cannot rotate the valves 2, only the handles 7 can, and control over the water mix is fully manual.

While in this fully manual mode, the rotation of the motors 5 does not affect the valves. However, if the electronic control system 10 has been activated, it is preferable to shut it to save energy when the system is switched to the manual mode. This can be performed manually, or the electronic control system could comprise a sensor (mechanical or electronic) to automatically shut itself down.

Alternatively, the reduction in required current for the motors 5 due to the reduced load could be sensed. According to yet another alternative, the control algorithm implemented in the electronic control system's microcomputer could shut off the electronic control system 10 based on sensing that the motor's rotation has no effect on the condition (temperature and/or flow rate) of the mixed water (due to the disconnection between the motors 5 and the valves 2).

It should be understood that with simple changes in design, alternatively, an inward position of the handles 7 would engage the motors 5 (automatic control) and an outward position would disengage (i.e. vice versa to the design shown in FIGS. 4A, 4B, 5A and 5B).

Using this disengaging type mechanism, which allows mechanical separation between the handle 7 and the gear wheel 15, the user can disconnect the handles from the motor 5 and a low-power high-reduction gearbox motor can be used. Also, when the handles 7 are disconnected from the electronic control system 10 and are connected to the gear wheels 15, and thus the valves 2, the faucet is in full manual control. In addition, when in the automatic mode, the handles 7 do not rotate as they are disconnected from the motor 5. Another advantage is that a switch from the automatic mode to the manual mode is solely a mechanical transformation and it does not rely on electronic circuitry that may malfunction.

It should be noted that the bearing 14 need not be included, but that in such a case the handles 7 would rotate while in the automatic mode.

Figure 6A:
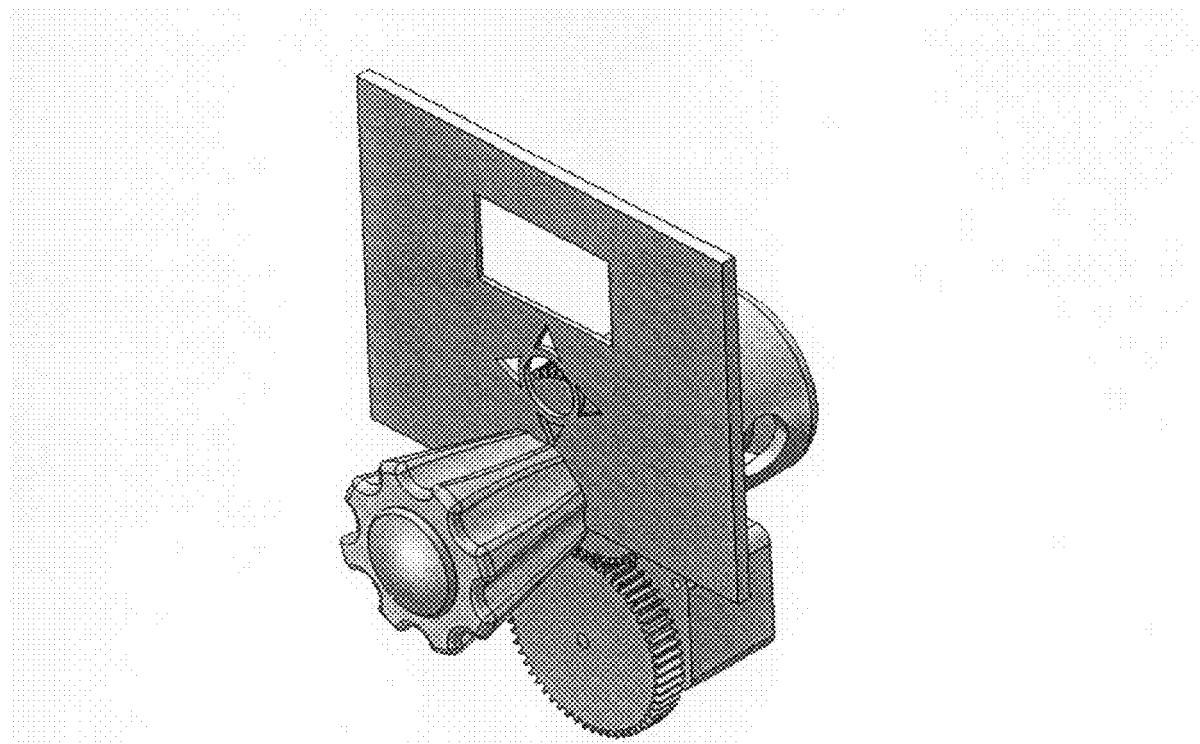
FIGS. 6A and 6B show perspective assembled and exploded views of another embodiment of the electronic faucet and override mechanism of the present invention.
Figure 6B:
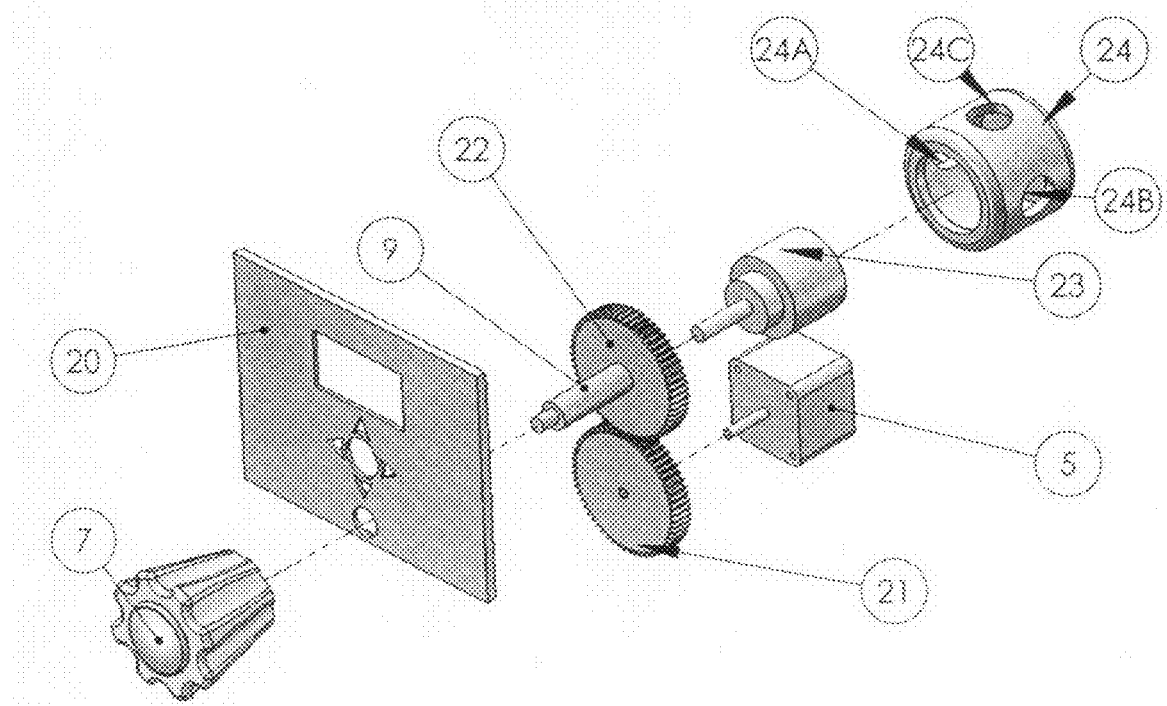

FIGS. 6A and 6B illustrate another embodiment of the present invention wherein the faucet comprises only one handle 7 and one motor 5 and so forth. Such a design is appropriate original installation and for retrofitting with single-handled faucets, which have become common. An example of such a faucet is one whereby the temperature is controlled by rotating a (single) handle and the flow is controlled by pulling the handle out or tilting it upward.

The electronic faucet of this embodiment comprises a water mixing body 24, which can be of a variety of configurations, having a hot water inlet 24A, a cold water inlet 24B and an outlet 24C for the mixed water. A sensor setup (not shown) such as in described in the embodiment of FIGS. 1A and 1B may be used.

The handle 7 is connected to its stem 9 which passes through a panel or plate 20, with one stem hole. The stem is connected to a valve gear 22 that intermeshes with a motor gear 21. There is a valve 23 that is seatable in the mixing body 24 to control both the flow (e.g. by axial movement) and the temperature (e.g. by rotational movement) of the outlet water flow.

In the embodiment shown in FIGS. 6A and 6B, the electronic faucet has two modes of operation. In the first, semi-automatic mode of operation, the user sets the desired water temperature using the electronic I/O (or alternatively, it is set by rotating the handle 7). Once the desired temperature is chosen, the user manually controls the flow rate by pulling the handle 7 outward. The electronic control system 10 performs closed-loop control over the delivered water temperature as described above.

The user can stop the water flow by pushing the handle 7 inward. During the semi-automatic mode of operation, the handle 7 will rotate as it is mechanically connected to the motor 5 via the transmission (gears 21 and 22).

The second mode of operation is the manual mode. Since the handle 7 and the valve 23 are mechanically connected the user can rotate the handles freely when the electronic control system 10 is off and change the temperature manually.

The user can switch from the manual mode to the semi-automatic mode by means of the electronic I/O. The user can also switch from the semi-automatic mode to the manual mode by turning off the electronic control system 10 or by the disabling method wherein the handle 7 is turned to counter the motor, as described with reference to the embodiment of FIGS. 1A and 1B.

Alternatively, the single-handled embodiment can incorporate the design wherein manual operation is accomplished by disengaging from the automatic control (best understood by FIG. 5A). According to other embodiments, the user can switch from automatic control to manual control via a proximity sensor (common in automatic public faucets) or other sensor, located, for example, in the handle 7.

To allow for fully automatic control, the single-handle embodiment could incorporate a mechanism, for example, that translates the valve 23 in and out of the mixing body 24, mutatis mutandis.

Thus, the reader can see that the electronic faucet and override system therefor of the invention has advantages over the prior art; including that the reuse of standard components commonly utilized in traditional non-electronic faucets makes the present faucet and override mechanism reliable and economical. Also, the manual override feature ensures the safety of the user as he or she can take manual control from the electronic control system at any time. Further, the manual control is achieved by the traditional, intuitive method of using the handle(s), similar to with standard, manual faucets. In addition, the possibility to operate in either the automatic or manual mode is comforting to techno-phobic users.

Although the above description and referenced figures refer to and illustrate specific components, configurations and mechanisms, these should not be construed as limiting the scope of the invention but as merely providing illustrations of some of the presently preferred embodiments of this invention.

For example, according to different embodiments, mutatis mutandis, the invention could comprise a pair of valves wherein a first valve controls the mixing ratio between the incoming cold and hot water and a second valve controls the flow of the mixed water. Thus, one handle would control the temperature and the other would control the flow, similar to the method with thermostatic non-electronic valves.

In other embodiments there may be additional gears in the transmission. In such a case, the handles could be connected to an intermediate (additional) gear.

In still other embodiments, for example, where the space considerations require, the components could be juxtaposed differently, e.g., the axes of these components can be perpendicular or at arbitrary angle one to the other.

In yet other embodiments, the disengaging mechanism wherein the handle(s) are pushed or pulled to switch between the manual and automatic modes of operation could be replaced by other actuation schemes. For example, via an additional knob, button and so forth at the front panel/plate. This scheme could be mechanically or electronically operated, for example by electromagnets actuated by a button press or proximity method, when the user's hands are close to the handles or hold the handles.

Accordingly, the scope of the invention should be determined not by the embodiments illustrated, but by the appended claims and their legal equivalents.

It should be understood that the above description is merely exemplary and that there are various embodiments of the present invention that may be devised, mutatis mutandis, and that the features described in the above-described embodiments may be used separately or in any sizable combination. Accordingly, the scope of the invention should be determined not by the embodiments illustrated, but by the appended claims and their legal equivalents.

The invention claimed is:

1. An electronic faucet for mixing a hot fluid and a cold fluid to a settable temperature and flow rate, the faucet comprising;
   a mixing body within said hot fluid and said cold fluid are mixed, said body comprising an inlet for the hot fluid and an inlet for the cold fluid, and an outlet from which the mixed fluids are discharged therefrom;
   at least one mixing valve at said mixing body to control the ratio of said hot and cold fluids;
   a temperature sensor for sensing the temperature of said mixed fluids and outputting a signal corresponding to said temperature;
   an electronic control system which receives said signal of said fluid temperature sensor for controlling said at least one mixing valve to adjust the ratio of the hot and cold fluids;
   an interface for programming said electronic control system to allow setting of at least one of the temperature and the flow rate of the mixed fluids; and
   at least one motor for adjusting at least one of the ratio of the hot and cold fluids received by the mixing body and the flow rate of the mixed fluids discharged from the mixing body;
wherein the faucet further comprises a manual override system comprising a handle or pair of handles operably connected to said electronic control system and adapted to override said electronic control system whereby the faucet is manually controllable by said handle or pair of handles and the mechanism to disable the electronic control system comprises at least one or driver operably connected to said electronic control system and the at least one motor, the motor driver adapted to detect an out of tolerance situation regarding a parameter of the motor(s) and detecting said out of tolerance situation, it disables the electronic control system.

2. A faucet according to claim 1, wherein the override system comprises a pair of handles.

3. A faucet according to claim 1, wherein the override system comprises a single handle.

4. A faucet according to claim 1, wherein the manual override system further comprises a mechanism to disengage the mixing control from the electronic control system to allow overriding therefrom.

5. A faucet according to claim 4, wherein the handle or pair of handles are connected to the at least one mixing valve via a connection comprising a valve gear; and
   in an automatic mode the at least one motor is operably connected to the at least one mixing valve via a transmission that comprises a motor gear that meshes with said valve gear; and the mechanism to disengage disengages said valve gear from said motor gear.

6. A faucet according to claim 1, wherein the parameter is the current one or more of the at least one motor.

7. A faucet according to claim 1, wherein the manual override system comprises a detection arrangement for detecting the movement of the handle and at least one of the handles.

8. A faucet according to claim 7, wherein the detection arrangement comprises a proximity detector to sense the proximity of the user's hand(s) to the handle(s).

9. A faucet according to claim 1, further comprising a flow rate sensor for sensing the flow rate of the mixed fluid and wherein the electronic control system is further adapted to control the flow rate of the mixed fluid.

10. A faucet according to claim 1, wherein the at least one mixing valve is a ceramic valve.

11. A manual override system for an electronically controlled faucet adapted to mix a hot fluid and a cold fluid in a mixing body to a settable temperature and flow rate, the faucet comprising:
    at least uric mixing valve at said mixing body to control the ratio of said hot and cold fluids;
    a temperature sensor for sensing the temperature of said mixed fluids and outputting a signal corresponding to said temperature;
    an electronic control system which receives said signal of said fluid temperature sensor for controlling said at least one mixing valve to adjust the ratio of the hot and cold fluids;
    an interface for programming said electronic control system to allow setting of at least one of the temperature and the flow rate of the mixed fluids; and
    at least one motor for adjusting at least one of the ratio of the hot and cold fluids received by the mixing body and the flow rate of the mixed fluids discharged from the mixing body;
the manual override system comprising a handle or pair of handles operably connected to said electronic control system and adapted to override said electronic control system whereby the faucet is manually controllable by said handle or pair of handles, wherein the mechanism to disable the electronic control system comprises at least one motor driver operably connected to said electronic control s stem and the at least one motor, the motor driver adapted to detect an out of tolerance situation regarding a parameter the motor(s) and upon detecting said out of tolerance situation, it disables the electronic control system.

12. A faucet according to claim 11, wherein the manual override system further comprises a mechanism to disengage the mixing control from the electronic control system to allow overriding therefrom.

13. A faucet according to claim 12, wherein the handle or pair of handles are connected to the at least one mixing valve via a connection comprising a valve gear;
    and in an automatic mode the at least one motor is operably connected to the at least one mixing valve via a transmission that comprises a motor gear that meshes with said valve gear; and the mechanism to disengage disengages said valve gear from said motor gear.

* * * * *